(12) United States Patent  (10) Patent No.: US 8,960,410 B2
Rebeaud et al.  (45) Date of Patent: Feb. 24, 2015

(54) DEVICE AND METHOD FOR PLACING PLATE-LIKE ELEMENTS IN A PROCESSING MACHINE

(75) Inventors: Jean-Claude Rebeaud, Le Mont (CH); Marco Cardillo, Lausanne (CH)

(73) Assignee: Bobst Mex SA (CH)

( * ) Notice: Subject to any disclaimer, the term of this patent is extended or adjusted under 35 U.S.C. 154(b) by 141 days.

(21) Appl. No.: 13/386,216

(22) PCT Filed: Jul. 16, 2010

(86) PCT No.: PCT/EP2010/004332
§ 371 (c)(1),
(2), (4) Date: Jan. 20, 2012

(87) PCT Pub. No.: WO2011/009567
PCT Pub. Date: Jan. 27, 2011

(65) Prior Publication Data
US 2012/0118703 A1  May 17, 2012

(30) Foreign Application Priority Data
Jul. 24, 2009  (EP) .................................. 09009620

(51) Int. Cl.
*B65G 25/00*  (2006.01)
*B65H 9/12*  (2006.01)
(Continued)

(52) U.S. Cl.
CPC ... *B65H 9/12* (2013.01); *B65G 43/08* (2013.01); *B65H 3/0816* (2013.01); *B65H 5/10* (2013.01); *B65H 7/08* (2013.01); *B65H 7/10* (2013.01);
(Continued)

(58) Field of Classification Search
USPC ........ 198/464.4; 271/230, 239, 243, 244, 253
See application file for complete search history.

(56) References Cited

U.S. PATENT DOCUMENTS 4,731,856 A * 3/1988 Lloyd et al. ................... 382/141
5,705,020 A  1/1998 Chiari
(Continued)

FOREIGN PATENT DOCUMENTS

CH  690470  9/2000
EP  0 680 906 A1  11/1995
(Continued)

OTHER PUBLICATIONS

International search report dated Oct. 21, 2010 issued in connection with International application No. PCT/EP2010/004332.

*Primary Examiner* — William R Harp
(74) *Attorney, Agent, or Firm* — Ostrolenk Faber LLP

(57) ABSTRACT

Method and apparatus for placing plate-like elements (10) within a processing machine (1): the machine including a feeder (20) for placing the elements (10) in a plurality of gripping members (31) of a conveyor (30) in successive stations (3, 4, 5). The feeder (20) has a fixing device (21) for elements. The feeder (20) is driven by a computation and control unit (40). The method includes successive steps during advancement of each plate-like element (10) of measuring the longitudinal and angular placement error of the plate-like element (10) relative to a theoretical position, by detecting its front or rear edge, controlling the feeder (20) according to the measured placement errors, activating the fixing device (21) to attach the plate-like element (10) to the feeder (20), then measuring the longitudinal, the transverse and angular placement error of the plate-like element (10) attached to the feeder (20), relative to a theoretical position, by detecting register marks (12) printed on the element (10).

4 Claims, 4 Drawing Sheets

(51) Int. Cl.
  *B65H 3/08*  (2006.01)
  *B65H 5/10*  (2006.01)
  *B65H 7/08*  (2006.01)
  *B65H 7/10*  (2006.01)
  *B65H 7/14*  (2006.01)
  *B65H 9/10*  (2006.01)
  *B65G 43/08*  (2006.01)

(52) U.S. Cl.
  CPC ............... *B65H 7/14* (2013.01); *B65H 9/105* (2013.01); *B65H 2511/20* (2013.01); *B65H 2511/24* (2013.01); *B65H 2511/242* (2013.01); *B65H 2511/512* (2013.01); *B65H 2511/514* (2013.01); *B65H 2701/131* (2013.01); *B65H 2701/1311* (2013.01); *B65H 2701/1313* (2013.01); *B65H 2801/42* (2013.01)

USPC .................................... 198/464.4; 271/243

(56) References Cited

U.S. PATENT DOCUMENTS 6,229,608 B1 * 5/2001 Morris .................. 356/623
6,378,862 B1   4/2002 Rebeaud
6,895,661 B1 * 5/2005 Gamel et al. ............. 29/740
7,603,198 B2 * 10/2009 Chiari ................... 700/218

FOREIGN PATENT DOCUMENTS

| EP | 0 687 997 | A2 | 12/1995 |
| EP | 1 044 908 | A  | 10/2000 |
| EP | 1 170 228 | A2 | 1/2002  |
| EP | 1 772 405 | A1 | 4/2007  |

* cited by examiner

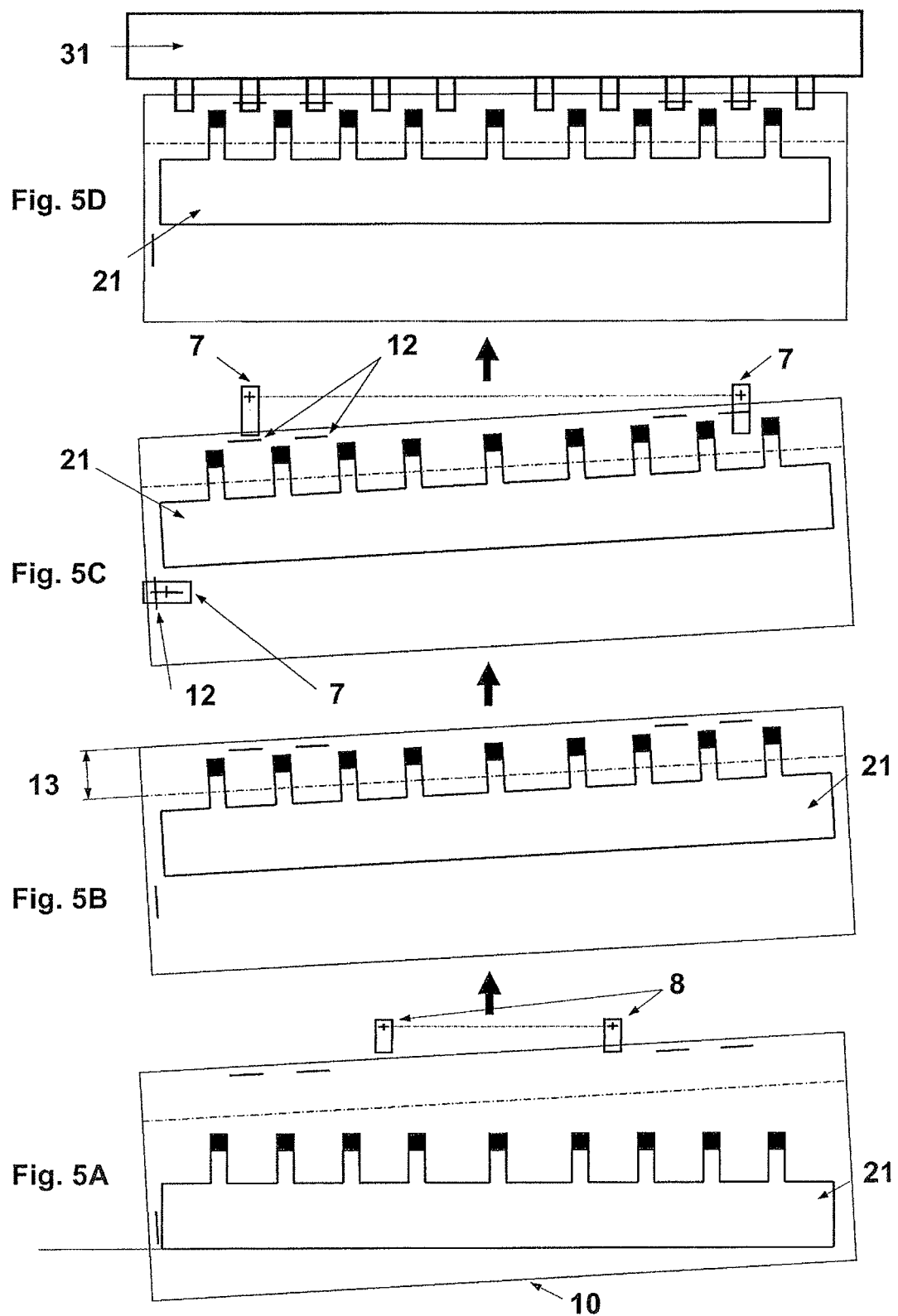

DEVICE AND METHOD FOR PLACING PLATE-LIKE ELEMENTS IN A PROCESSING MACHINE

CROSS-REFERENCE TO RELATED APPLICATIONS

The present application is a 35 U.S.C. §§371 national phase conversion of PCT/EP2010/004332, filed Jul. 16, 2010, which claims priority of European Application No. 09009620.7, filed Jul. 24, 2009, the contents of which are incorporated by reference herein. The PCT International Application was published in the French language.

The present invention concerns a device and a method for placing plate-like elements in the feeder station of a machine for processing plate-like elements, and concerns a machine for processing plate-like elements comprising said device or using said method.

Such machines are used notably in the printing and packaging industry, for example for making cardboard boxes from plate-like elements such as pre-printed cardboard sheets. In a feeder station, these sheets are taken from a stack situated upstream of the machine and are then placed by a feeder in pincer bars mounted at regular intervals on a subsequent line of endless chains. The latter makes it possible to convey the sheets into the various subsequent processing stations of the machine. Typically, such stations are devoted to the punching of the sheets, to the ejection of the punching waste and to the reception in a stack of these punched sheets.

In a paced flow, the line of chains moves and stops periodically so that, during each movement, all the pincer bars engaged with a sheet are passed from one station to the adjacent downstream station. To obtain a quality printing or converting operation, the placement of the sheets within the various successive stations is crucial. In punching a printed sheet, sheet placement in the punching station must be precise. Specifically, care should be taken that tools used for the punching, for example the punching form of a platen press, are in perfect register with the printing that has been previously done on the sheet.

Patent CH 690'470 discloses a device for ensuring the quality of production of a press for manufacturing packages. This device comprises a camera designed to read register marks associated with the printing, and to read a mark designed for registering the position of the punch. These register marks are placed on the front waste section of the sheet held by the pincer bar. The punching mark is made by a perforator attached to the punching tools, which makes a hole in the front waste section of the sheet at the same time as it punches the sheet. Further downstream, another device marks those sheets identified by the camera as being defective, namely those sheets that have an out-of-tolerance offset between the printing and the punching.

Patent EP 1'044'908 relates to a device and a method for placing plate-like elements in a feeder station. From a table situated in a starting rear position, this method includes engaging means for fixing a plate-like element on the table and then controlling actuators in order to allow that element to be moved forward depending on the position of the plate-like element on the table. As a result, the front edge of the plate-like element is conveyed, stopped and then released in a predetermined position in the pincers of the pincer bar of the conveying device before the table has been finally returned to the starting position. To move the table forward, and if necessary laterally or obliquely, by an appropriate amount, optoelectronic means read the coordinates of the position of the plate-like element and compute the movement necessary to be able to place it in the pincer bar in the best way possible.

The device and the method described in EP 1'044'908 operates remarkably well and has made it possible to considerably increase the production rates of the processing machines by carrying out the measurements on the fly and the corrections of placement of each plate-like element, without it being necessary to stop the plate-like element. Nevertheless, when a plate-like element is very much advanced or when it is very askew, the fixing means may take hold of the plate-like element not on the front waste section but on a printed portion. There is a risk of damaging the print and the structure of the plate-like element in an area outside the front waste section.

The object of the present invention is to remedy the aforementioned drawbacks and to improve the quality of the plate like elements. The invention also makes it possible to correct placement errors that are more serious and therefore to reduce the risk of machine stoppage associated with an out-of-tolerance placement error of a plate-like element.

SUMMARY OF THE INVENTION

Accordingly, the subject of the present invention is a method for placing plate-like elements within a machine and a plate-like element processing machine using this method.

The method and apparatus of the invention is for placing plate-like elements within a processing machine.

The machine includes a feeder for placing the elements in a plurality of gripping members of a conveyor in successive stations. The feeder has a fixing device for elements. The feeder is driven by a computation and control unit.

The method includes successive steps during advancement of each plate-like element, measuring the longitudinal and angular placement error of the plate-like element relative to a theoretical position, by detecting its front or rear edge, controlling the feeder according to the measured placement errors, activating the fixing device to attach the plate-like element to the feeder, then measuring the longitudinal, the transverse and angular placement error of the plate-like element attached to the feeder, relative to a theoretical position, by detecting register marks printed on the element.

BRIEF DESCRIPTION OF THE DRAWINGS

The invention will be better understood on studying embodiments used in a nonlimiting manner and illustrated by the appended figures in which:

FIGS. 5A to 5D represent schematically the use of the method according to the invention by a processing machine according to the invention.

DESCRIPTION OF A PREFERRED EMBODIMENT

Figure 2:
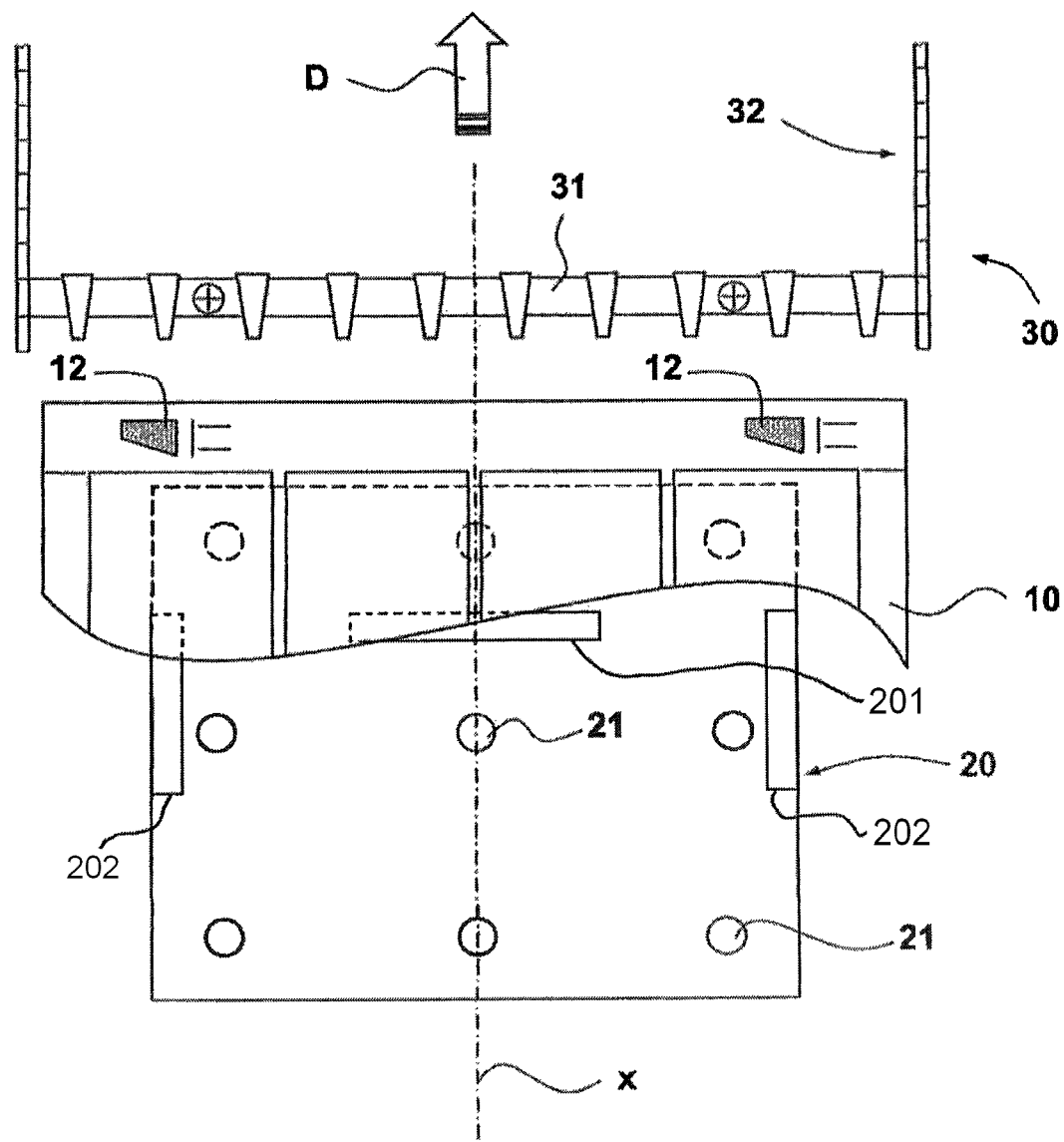
FIG. 2 is a schematic plan view of the front edge of a plate-like element moving in the direction of a pincer bar in order to be gripped by the latter.

The terms "upstream" and "downstream" are defined with reference to the direction of movement of plate-like elements 10, as illustrated by the arrow D in FIG. 2. These elements move from upstream to downstream, generally following the main axis X of the machine, in a movement paced by periodic stops. The front edge of a plate-like element corresponds to the downstream and the rear edge to the upstream. The adjectives "longitudinal" and "lateral" are defined with respect to this main axis X. The terms "plate-like elements" and "sheets" are equivalent, and relate both to elements consisting of corrugated cardboard and flat cardboard, of paper or of any other material routinely used in the packaging industry.

Figure 1:
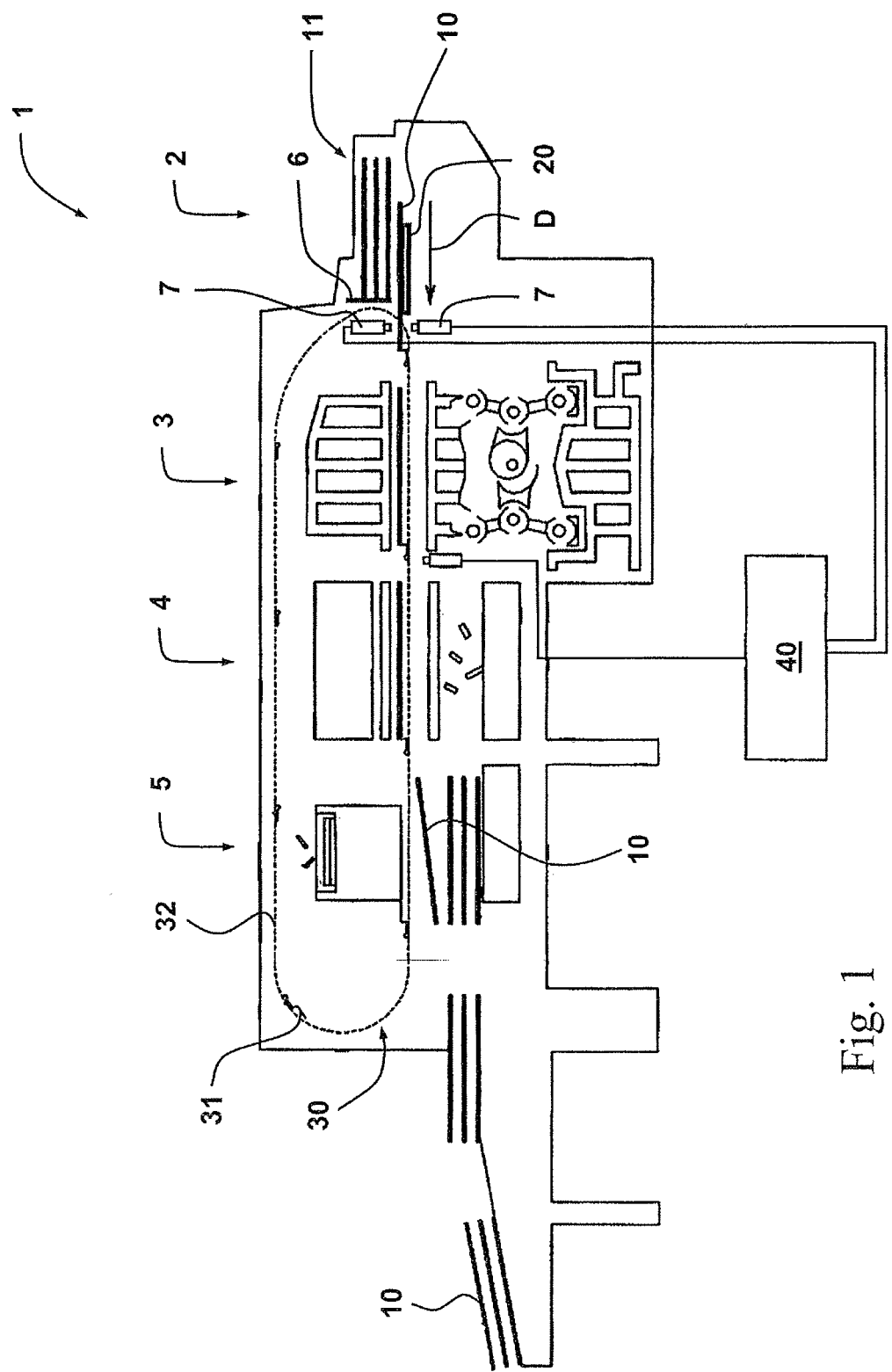
FIG. 1 is a schematic representation of a first type of processing machine in which plate-like elements flow conveyed by pincer bars.

FIG. 1 shows a schematic overview of a processing machine 1 in which the method of the present invention can be applied. This machine comprises a series of processing stations typically including a feeder station 2 followed by a punching station 3, a waste ejection station 4 and a reception station 5. The number and nature of processing stations may vary depending on the complexity of the converting operations to be carried out on the plate-like elements 10.

In the feeder station 2, these plate-like elements 10 are placed in a stack 11 which rests notably against a gauge 6 also used as a front stop for these elements. By virtue of the interstice or gap left at the bottom of the gauge 6, these elements can be withdrawn one by one from the bottom of a stack 11 then and transferred to a feeder 20. This device makes it possible to feed each element 10 into a gripping member 31 of a conveyor 30, as can be better seen in FIG. 2. This conveyor may comprise a line of chains 32. Between the chains of the line, a plurality of pincer bars is arranged, each one used as a gripping member 31 for the plate-like element 10.

The line of chains 32 moves and stops periodically. During a movement, each gripping member 31 is passed from one station to the adjacent downstream station. The position of the stops of the gripping members 31 are dictated by the line of chains 32 moving a constant distance. This distance corresponds to the theoretical pitch of these members on the line of chains. The processing stations 2, 3, 4 and 5 are fixed and separated by this same pitch so that, at each stop, the gripping members 31 stop in register with the tools at these stations. This type of machine is most frequently used for processing plate-like elements of corrugated cardboard.

FIG. 2 shows, in a schematic view from above, a downstream portion of a plate-like element 10 being moved toward a pincer bar by the feeder 20. In the example of a processing machine shown in FIG. 2, the feeder 20 is furnished with a fixing device 21 comprised of a suction plate. This fixing device 21 makes it possible to suck a plate-like element from the bottom of the stack 11 and to thus attach it to the feeder 20. This will cause the plate-like element 10 to slide beneath the gauge 6 and bring it into a determined position in engagement with the pincers of the gripping member 31. The trajectory of the feeder 20 depends on the initial position of the plate-like element 10 at the bottom of the stack. This position is measured by first sensors 7 situated directly downstream of the gauge 6 (FIG. 1). Preferably, one pair of these sensors will be placed above the plane of passage of the plate-like elements and another will be placed below. By virtue of this arrangement, it becomes possible to read the printed marks 12 (FIG. 2) allowing the registering of a print made either on the front face or on the back face of the plate-like element. Such register marks 12 are usually placed on its front portion, namely on the front waste section that is used by the gripping member to take hold of the plate-like element, but may also be placed on the lateral portion of the plate-like element 10, notably in order to measure the lateral position of the plate-like element, in order to carry out a lateral alignment. The sensors 7 measure the intensity of the light reflected by the surface of the plate-like element 10 when it is lit by a lighting device, in a predetermined zone in which the register marks are located. A processing of the signal obtained then makes it possible to compute the position of the register mark. For reasons of space requirement, the lighting device is sometimes incorporated into the sensor 7 but that is not a necessity. In the exemplary embodiment of FIG. 2, the sensors 7 incorporate the lighting devices.

When the measurements are taken by said first sensors 7, these measurements are immediately transmitted to a computing and control unit 40 for the computation of the position of the register marks and of the trajectory of the feeder 20. Knowing the theoretical stopping position of the gripping member 31 in the feeder station, the control unit is capable of computing the values of the movement parameters (lateral, longitudinal or askew) of the feeder 20 so that the latter correctly brings the plate-like element 10 so that it is conveyed into the gripping member 31, depending on its initial starting position. These computations are carried out by the computation and control unit 40 which also controls the feeder 20.

The plate-like element 10 will then be conveyed by the gripping member 31 into the punching station 3 where it will be punched according to a die corresponding to the opened-out shape that it is desired to obtain, for example for the purpose of obtaining a plurality of boxes of a given shape. In this station, or in one or more subsequent stations, other operations can also be carried out such as the scoring of fold lines, the embossing of certain surfaces and/or the placing of motifs from metalized strips for example.

Figure 3:
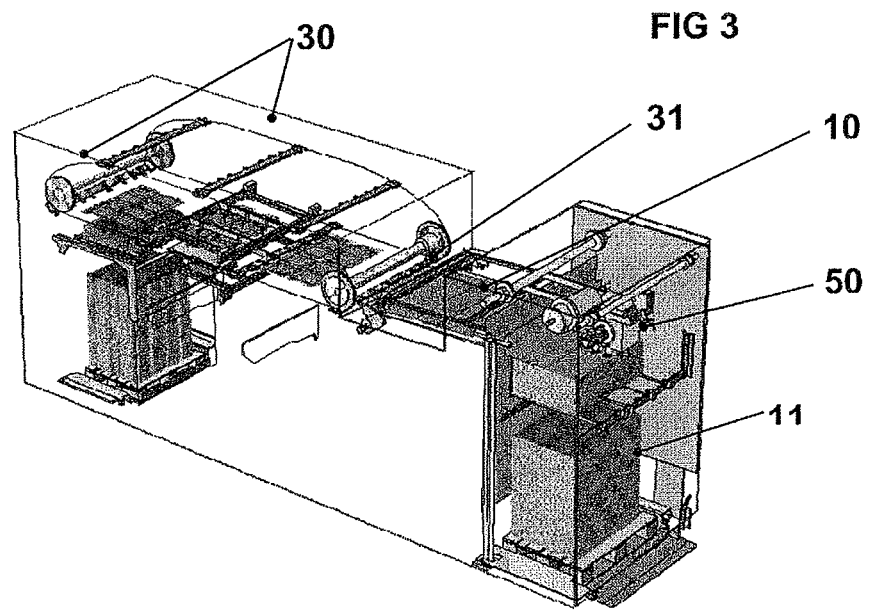
FIGS. 3 and 4 are schematic representations of a second type of processing machine in which plate-like elements flow conveyed by pincer bars.

FIG. 3 represents another example of a die press that is currently known in which the plate-like elements 10 to be worked are sheets taken from the top of the stack 11, placed in the form of an overlapping stream and then conveyed to a feed board before being inserted into the pincers 31 of the conveyor 30 of the punching station of the press. Therefore document EP1170228 describes an example of a device for sheet-by-sheet feeding for placing in an overlapping stream; and document EP0680906 describes an example of a conveyor of the punching station of the press using pincer bars.

Figure 4:
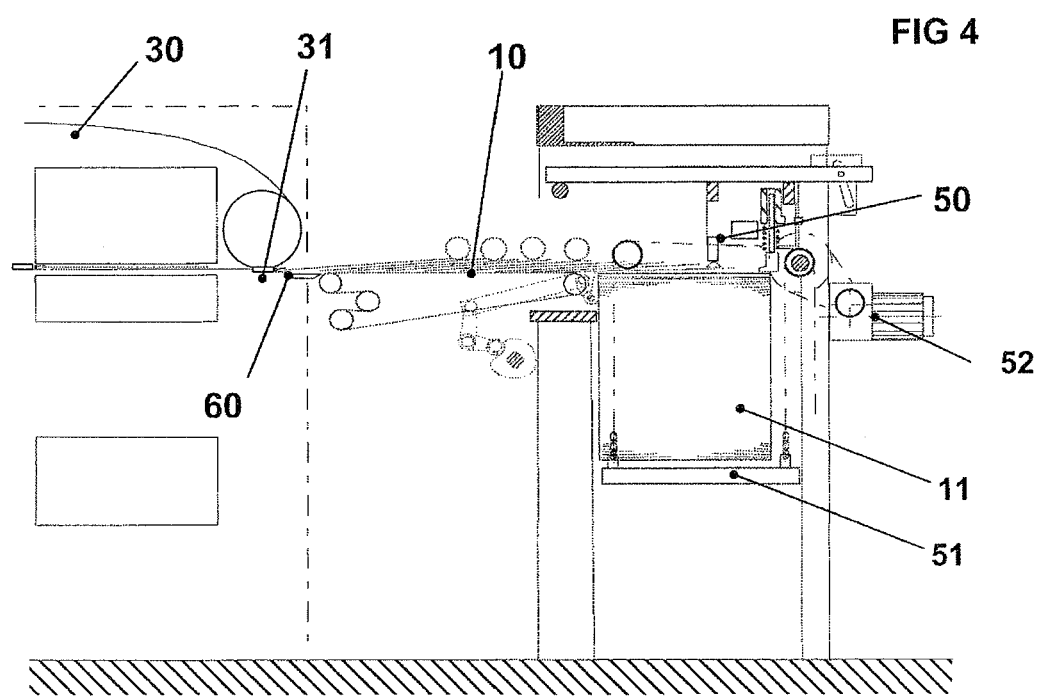

The devices for placing the sheets in an overlapping stream and for conveying the overlapping stream are shown in greater detail in FIG. 4. The stack 11 is shared out into an overlapping stream by the sucker unit 50, the top of the stack 11 being kept at a constant level by virtue of the raising of the stack-holder tray 51 driven by a motor 52. The sheet on the top of the stack 11 is picked up from the back and then pushed forward by the sucker unit 50 so as to form the overlapping stream, the front portion of the sheet 10 sliding beneath the previous sheet.

The sheets of the overlapping stream are precisely placed longitudinally and laterally by a placement device 60 which has an operation similar to that of the feeder 20 of the processing machine shown in FIGS. 1 and 2. Document EP 1044908 describes an example of a device for placing the sheets that form the overlapping stream 3. As described in this document, the placement occurs at the end of the feed board closest to the conveyor 30 of the punching station, by using a sophisticated system that does not require the sheets to stop. The placement device 60 comprises a table furnished with a fixing device comprising pincers the function of which, identical to that of the suction plate 21 of the feeder 20 shown in FIG. 2, is to attach a plate-like element 10 to the table in order to convey it into the gripping member 31 depending on its initial starting position in a manner similar to that described above. Thus sensors measure the reflected light intensity which makes it possible to compute the position of the register marks and the movement that the table of the placement device must make in order to correctly place the front edge of the plate-like element in the gripping member 31. This type of press is most frequently used when the plate-like elements 10 are sheets of flat cardboard.

The object of the present invention is therefore to ensure a perfect placement of the plate-like elements 10 in the gripping members 31 with a greatly increased capability for positional correction so as to reduce the number of stoppages of the machine associated with out-of-tolerance placement errors. The invention relates to the placement method as well as to the machines for processing plate-like elements capable of using this placement method. In the following detailed description of exemplary embodiments of the invention, the term "feeder" will be used to designate a device the function of which is to feed the downstream edge of a plate-like element 10 into the gripping member 31. Such a device corresponds to the feeder 20 shown in FIGS. 1 and 2, or to the placement device 60 shown in FIG. 4 and explained in detail in document EP1044908. The feeder is furnished with a fixing device which makes it possible to attach the plate-like element 10 to the feeder. The above examples have shown that the fixing device could take different forms, such as that of a suction plate 21 shown in FIG. 2, or that of pincers.

For the rest of the description, the terminology and the numbering of the elements will be those of FIGS. 1 and 2. "Mark" is understood to be any surface treatment applied in order to obtain a sharp variation in reflected light intensity.

A plate-like processing machine according to the invention conventionally comprises a feeder 20 furnished with a fixing device 21. The feeder 20 makes it possible to place the plate-like elements 10 in a plurality of gripping members 31 of a conveyor 30 which conveys them in a paced flow into successive stations. Also conventionally, a processing machine according to the invention comprises at least three sensors 7 which measure the light intensity reflected by the surface of the plate-like element when it is attached to the feeder 20 by the fixing device 21 so as to measure the position of register marks 12 that are printed thereon. One of the sensors 7 is capable of measuring the lateral position of a register mark 12 printed on a lateral edge of the plate-like element 10 and the other two sensors 7 are capable of measuring the longitudinal position of two register marks 12 printed on the front edge of the plate-like element 10.

The processing machine according to the invention preferably comprises three lighting devices, typically of the LED type, placed so as to light the printed register marks 12 in order to improve the measurements taken by the sensors 7. The lighting devices may advantageously be incorporated into the sensors 7, which provides advantages in terms of space requirement, of ease of mechanical installation and adjustment, but also in terms of maintenance.

The processing machine according to the invention comprises driving devices, typically linear motors, capable of moving the feeder 20. A lateral driving device 201 is used to move the feeder 20 in the lateral direction. Two longitudinal driving devices 202 are used to move the feeder 20 in the longitudinal direction. When the two longitudinal driving devices 202 receive different signals, they cause the feeder 20 to rotate about an axis perpendicular to its surface and if necessary to the surface of the plate-like element that it conveys.

The processing machine according to the invention also comprises a computation and control unit 40, of the microprocessor or microcontroller type. The computation and control unit receives the measurements taken by the sensors 7 and computes lateral, longitudinal and angular placement errors according to these measurements and theoretical positions that the register marks of the plate-like element conveyed by the feeder 20 should have.

The computation and control unit 40 controls the driving devices 201 and 202 that move the feeder 20 so as to correct these lateral, longitudinal and angular placement errors in order to ensure a perfect placement of the front edge of the plate-like element 10 in a gripping member 31.

All these elements are already known in combination. They make it possible to apply a method comparable to that described in document EP 1044908, by performing successive steps consisting in, during the advancement of each plate-like element 10, activating the fixing device 21 in order to attach the plate-like element 10 to the feeder 20, then measuring the longitudinal placement error, the transverse placement error and the angular placement error of the plate-like element 10 attached to the feeder 20, relative to a theoretical position, by detecting register marks 12 printed on said plate-like element 10, and finally controlling the feeder 20 according to the placement errors of the plate-like element 10 to which it is attached.

It is essential that all these steps occur during the advancement of each plate-like element 10. This means in particular that this plate-like element is seized on the fly by the fixing device 21, without stopping, and that the measurements and the corrections are also carried out during this advancement. Thus the plate-like element 10 never ceases to advance, which makes it possible to achieve very high processing rates of the order of 12 000 sheets per hour.

The placement method according to the invention differs from the existing methods in that it comprises additional steps which also occur during the advancement of the plate-like element 10 but before it is attached to the feeder 20 by the fixing device 21. A first additional step consists in measuring longitudinal and angular placement errors of one of the transverse edges of the plate-like element 10, that is to say either its front edge or its rear edge. A second additional step consists in controlling the feeder 20 according to the measured longitudinal placement error and the angular placement error.

Specifically, in the existing systems, the fixing device 21 seizes each plate-like element in the same manner, however, this does not make it possible to correct simultaneous significant errors of longitudinal and angular placement because the seizure cannot be carried out correctly.

FIGS. 5A and 5B represent schematically the placement method according to the invention. In FIG. 5A, a plate-like element 10 is presented with a considerable angular positioning error and an insignificant longitudinal placement error. Two front sensors 8 make it possible to measure at the same time the longitudinal placement error and the angular placement error.

FIG. 5B represents the moment when the fixing device attaches the plate-like element 10 to the feeder 20. Since the latter has been controlled according to the measured placement errors, the fixing device 21 seizes the plate-like element 10 on the fly by pinching it precisely in the front waste section 13 which is on the front edge.

FIG. 5C represents schematically the measurement of the lateral, longitudinal and angular placement errors of the plate-like element 10 by virtue of the sensors 7. FIG. 5D represents schematically the placement of the plate-like element 10 when it is seized by the pincers of the gripping member 31.

Thus a processing machine according to the invention comprises at least two sensors 8 capable of detecting the passage of a longitudinal edge of the plate-like element 10, when the latter is in motion but before it is seized on the fly by the fixing device 21 in order to attach it to the feeder 20.

Consequently, the sensors 8 are placed upstream of the sensors 7. In FIGS. 5, it is the passage of the front edge that is detected. Alternatively, it is totally possible to measure the placement of the upstream edge by detecting the passage of the rear edge of the plate-like element 10. In both cases, the sensors 8 may be of extremely simple construction. For example, the breaking of two light beams is sufficient to detect the passage of the front edge. Alternatively, the sudden variation of the signal supplied by inductive sensors sliding or rolling on the surface of the plate-like element makes it possible to easily detect the rear edge.

In both cases, it is a transit time that is determined by the computation and control unit 40 by virtue of the measurements sent by the sensors 8. The computation and control unit 40 then computes the placement errors in the knowledge of the speed of movement, then as a consequence controls the feeder 20 by sending control signals to the lateral driving device 201 and to the longitudinal driving devices 202.

This method and the machines that use it therefore make it possible to correct simultaneous significant errors of longitudinal placement and angular placement and to considerably reduce the risk of machine stoppage because of out-of-tolerance placement errors.

The invention claimed is:

1. A method for placing plate-like elements within a processing machine, wherein the machine comprises a feeder for placing the plate-like elements, and a plurality of grippers of a conveyor in which the elements are placed by the feeder, the conveyor conveying the elements in a paced flow to successive stations, the feeder having a gripper, the feeder being driven by a computation and control unit;

the method comprising the successive steps of:
advancing the plate elements in a downstream direction; and
during the advancement of each plate-like element:
measuring a longitudinal placement error and an angular placement error of the plate-like element at the same time relative to a theoretical position, by detecting at least one of a front edge or a rear edge of the plate-like element by at least two sensors, at least one sensor being located in a first lateral direction relative to the downstream direction and at least one sensor being located in a second lateral direction relative to the downstream direction, the second lateral direction being in an opposite direction from the first lateral direction;
controlling the feeder according to the measured longitudinal placement error and the measured angular placement error;
then activating the gripper of the feeder to attach the plate-like element to the feeder;
then measuring the longitudinal placement error, a transverse placement error and the angular placement error of the plate-like element then attached to the feeder, relative to a theoretical position, by detecting register marks printed on the plate-like element; and
controlling the feeder according to the measured placement errors of the plate-like element to which the feeder is attached.

2. A machine for processing plate-like elements comprising:
a conveyor for conveying a plurality of plate-like elements in a longitudinal direction, the conveyor having a plurality of grippers;
a feeder including a gripper for placing the plate-like elements in the plurality of grippers of the conveyor, the conveyor conveying the plate-like elements in a paced flow into successive stations;
a lateral linear motor configured and capable of moving the feeder in a lateral direction relative to the longitudinal direction;
two longitudinal linear motors configured and capable of moving the feeder in the longitudinal direction;
at least three first sensors configured and capable of measuring light intensity first reflected by a surface of the plate-like element;
a computation and control unit receiving measurements from the first sensors and controlling the lateral linear motor, the longitudinal linear motors and the gripper of the feeder; and
at least two second sensors configured and capable of detecting the passage of a longitudinal edge of the plate-like element while the plate-like element is in motion before the plate-like element is gripped by the gripper of the feeder and configured and capable of detecting a longitudinal placement error and an angular placement error of the plate-like element at the same time relative to a theoretical position; the second sensors being placed upstream in the longitudinal direction of the first sensors, and being connected to the computation and control unit; at least one sensor of the second sensors being located in a first lateral direction relative to the longitudinal direction and at least one sensor of the second sensors being located in a second lateral direction relative to the longitudinal direction, the second lateral direction being in an opposite direction from the first lateral direction.

3. A machine for processing plate-like elements according to claim 2, wherein the second sensors detect the passage of the front edge of the plate-like element.

4. A machine for processing plate-like elements according to claim 2, wherein the second sensors detect the passage of the rear edge of the plate-like element.

* * * * *